United States Patent [19]

Taylor

[11] Patent Number: 4,704,923

[45] Date of Patent: Nov. 10, 1987

[54] POWER TRAIN HAVING AN INFINITELY VARIABLE TRANSMISSION

[76] Inventor: Paul R. Taylor, P.O. Box 101, Pelican Lake, Wis. 54463

[21] Appl. No.: 737,541

[22] Filed: May 24, 1985

Related U.S. Application Data

[63] Continuation-in-part of Ser. No. 517,015, Jul. 25, 1983, Pat. No. 4,662,245.

[51] Int. Cl.[4] ............................................. F16H 3/44
[52] U.S. Cl. ........................................ 74/785; 74/793
[58] Field of Search ................. 74/793, 794, 796, 786, 74/787, 788, 789, 751, 752 R, 665 A, 665 B, 720 S, 687, 689, 718, 720, 677

[56] References Cited

U.S. PATENT DOCUMENTS

| | | | |
|---|---|---|---|
| 1,190,278 | 7/1916 | Foote | 74/797 |
| 1,320,530 | 11/1919 | Buehler | 74/801 |
| 1,752,385 | 4/1930 | Johnson | 74/794 |
| 2,301,292 | 11/1942 | Krick | 74/793 |
| 2,454,694 | 1/1948 | Grebb | 74/794 |
| 2,743,628 | 5/1956 | Scharaffa | 74/794 |
| 3,008,341 | 11/1961 | Cobb | 74/687 |
| 3,008,355 | 11/1961 | Grudin | 74/801 |
| 3,013,452 | 12/1961 | Hornbostel | 74/687 |
| 3,163,056 | 12/1964 | Clarke | 74/793 |
| 3,320,830 | 5/1967 | Fowell | 74/687 |
| 3,511,113 | 5/1970 | Rheault | 74/794 |
| 3,733,931 | 5/1973 | Nyman et al. | 74/687 |
| 4,142,426 | 3/1979 | Bararyi | 74/801 |
| 4,382,392 | 5/1983 | Meyerle et al. | 74/687 |
| 4,392,393 | 7/1983 | Montgomery | 74/665 B |
| 4,472,984 | 9/1984 | Cook | 74/793 |
| 4,579,019 | 4/1986 | Gabriele | 74/793 |
| 4,592,454 | 6/1986 | Michel | 74/687 |
| 4,610,184 | 9/1986 | Taylor | 74/786 |

FOREIGN PATENT DOCUMENTS 1530590 10/1969 Fed. Rep. of Germany ........ 74/687
1918954 10/1970 Fed. Rep. of Germany ........ 74/677

OTHER PUBLICATIONS

Sterland, E. G., *Energy into Power The Story of Man and Machines*, The Natural History Press, for the American Museum of Natural History, New York, N.Y. 1967.
Norbye, Jan P., *The Gas Turbine Engine Design Development Applications*, Chilton Book Company, Radnor, Pennsylvania, 1975.

*Primary Examiner*—Leslie Braun
*Assistant Examiner*—David Novais
*Attorney, Agent, or Firm*—Peterson, Wicks, Nemer & Kamrath

[57] ABSTRACT

An infinitely variable transmission requiring no external controls is shown in its preferred embodiment of the present invention as including a power housing rotatably mounted on an input and an output shaft. The output shaft includes a planetary cage and planetary gears located in the interior of the power housing. The planetary gears are in gearing relation with a sun gear located on the input shaft in the interior of the power housing and also in gearing relation with a ring gear formed as part of the power housing. The internal resistance of the transmission created by the drag and friction of the drive, planetary, and ring gears gearing together and the viscosity of the lubricant influences the rotation and acceleration of the output. Power trains according to the present invention may be utilized to influence the output acceleration by including input motors rotatably connected to the input and to the power housing and in a preferred form a distribution valve is added to regulate the power flow from the power source to the individual input motors. Power sources are further disclosed according to the present invention allowing a continuous chemical fluid combustion process for powering the two input motors.

18 Claims, 7 Drawing Figures

POWER TRAIN HAVING AN INFINITELY VARIABLE TRANSMISSION

CROSS REFERENCE

The present application is a continuation-in-part of application Ser. No. 517,015 filed July 25, 1983, now U.S. Pat. No. 4,662,245 entitled "Infinitely Variable Transmission."

BACKGROUND

This invention relates generally to transmissions, more particularly to infinitely variable transmissions, and specifically to infinitely variable transmissions requiring no external controls and to power trains and systems which utilize such infinitely variable transmissions.

In the field of transmissions, a need has arisen for a transmission allowing the ratio between the input and output shafts to infinitely vary according to the rotational speed of the input shaft and the load on the output shaft. Further, such an infinitely variable transmission should allow the automatic selection of its own ratio in its range, based upon the input power, output load, and gear frictional resistance, and without the use of external members such as gear shifting members and the like. Additionally, such an infinitely variable transmission should have little power drag when the transmission is in direct drive.

Further a need has arisen for power trains utilizing such an infinitely variable transmission to power a varying rotational load through an infinite speed range in a smooth and stepless manner. Additionally, this speed control should be accomplished without excessive loads being placed on the power unit, so that an optimum speed ratio is maintained in spite of continuously varying load factors, but without requiring the use of any gear shifting members to control the ratio of the infinitely variable transmission. Still further this power train should have a high power to weight ratio, be mechanically efficient, be able to provide a dynamic braking effect, and be simple to manufacture and service.

Further, a need has arisen for a power source utilized within such a powertrain which is fuel efficient, mechanically efficient, produces few harmful exhaust emissions, is simple to manufacture and service, and has a high power to weight ratio.

SUMMARY

The present invention solves the above and other needs by providing, in the preferred embodiment, an infinitely variable transmission having a power housing into which an input and an output extend. The output includes a planetary gear which is parallel to but spaced from the input and output transmission axis. The planetary gear is in gearing relation a drive gear located on the input and a ring gear located in the interior of the power housing. The transmission has an internal resistance created by the drag and friction of the gears and the viscosity of the lubricant for influencing the rotation and acceleration of the output. If the load is sufficient, the power housing will rotate in a direction opposite the direction of the input and output when the output is initially accelerated and will cease rotation and rotate in the same direction as the direction of the input and output as the output is further rotated.

Furthermore, the present invention solves the above and other needs by providing a power train including a first motor for driving the input of the infinitely variable transmission and a second motor for driving the power housing of the infinitely variable transmission.

Further, the present, invention solves the above and other needs by providing a differentiating valve assembly interposed between the power source and the first and second motors for adjustably varying the power flow from the power source between the first and second motors.

Further, the present invention solves the above and other needs by providing a concentric drive arrangement between the first and second motors and the infinitely variable transmission in a power train.

Further, the present invention solves the above and other needs by providing a continuous combustion power source for use in a power train having an infinitely variable transmission.

It is thus a primary object of the present invention to provide a novel infinitely variable transmission.

It is further a primary object of the present invention to provide a novel power train.

It is further a primary object of the present invention to provide a novel power source for use in a power train having two inputs and a single output.

It is further an object of the present invention to provide such a novel infinitely variable transmission which is of simple construction.

It is further an object of the present invention to provide such a novel infinitely variable transmission which is variable in response to the rotational speed of the input shaft and the load on the output shaft.

It is further an object of the present invention to provide such a novel infinitely variable transmission which allows the automatic selection of the input/output rotational ratio.

It is further an object of the present invention to provide such a novel infinitely variable transmission which contains few parts, is small in size, and is easy to assemble.

It is further an object of the present invention to provide such a novel infinitely variable transmission having the ability to operate without any linkage or controls external of the transmission for influencing the input/output rotational ratio.

It is further an object of the present invention to provide such a novel power train which is of simple construction, contains few parts, is small in size, and has a high power to weight ratio.

It is further an object of the present invention to provide such a novel power train which utilizes an infinitely variable transmission having no external controls.

It is further an object of the present invention to provide such a novel power train which enhances the load compensating speed control of an infinitely variable transmission.

It is further an object of the present invention to provide such a novel power train which increases the overall speed range.

It is further an object of the present invention to provide such a novel power train which employs a power flow differentiating valve.

It is further an object of the present invention to provide such a novel power train which may provide a dynamic braking effect to decelerate an attached rotational load.

It is further an object of the present invention to provide such a novel power source having a continuous combustion power flow from a chemical fuel combustion process.

It is further an object of the present invention to provide such a novel power source featuring power flow for two outputs. These and further objects and advantages of the present invention will become clearer in the light of the following description of an illustrative embodiment of this invention described in connection with the drawings.

DESCRIPTION OF THE DRAWINGS

The illustrative. embodiment may best be described by reference to the accompanying drawings where.

All figures are drawn for ease of explanation of the basic teachings of the present invention only; the extension of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, gear ratio, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

Figure 1:
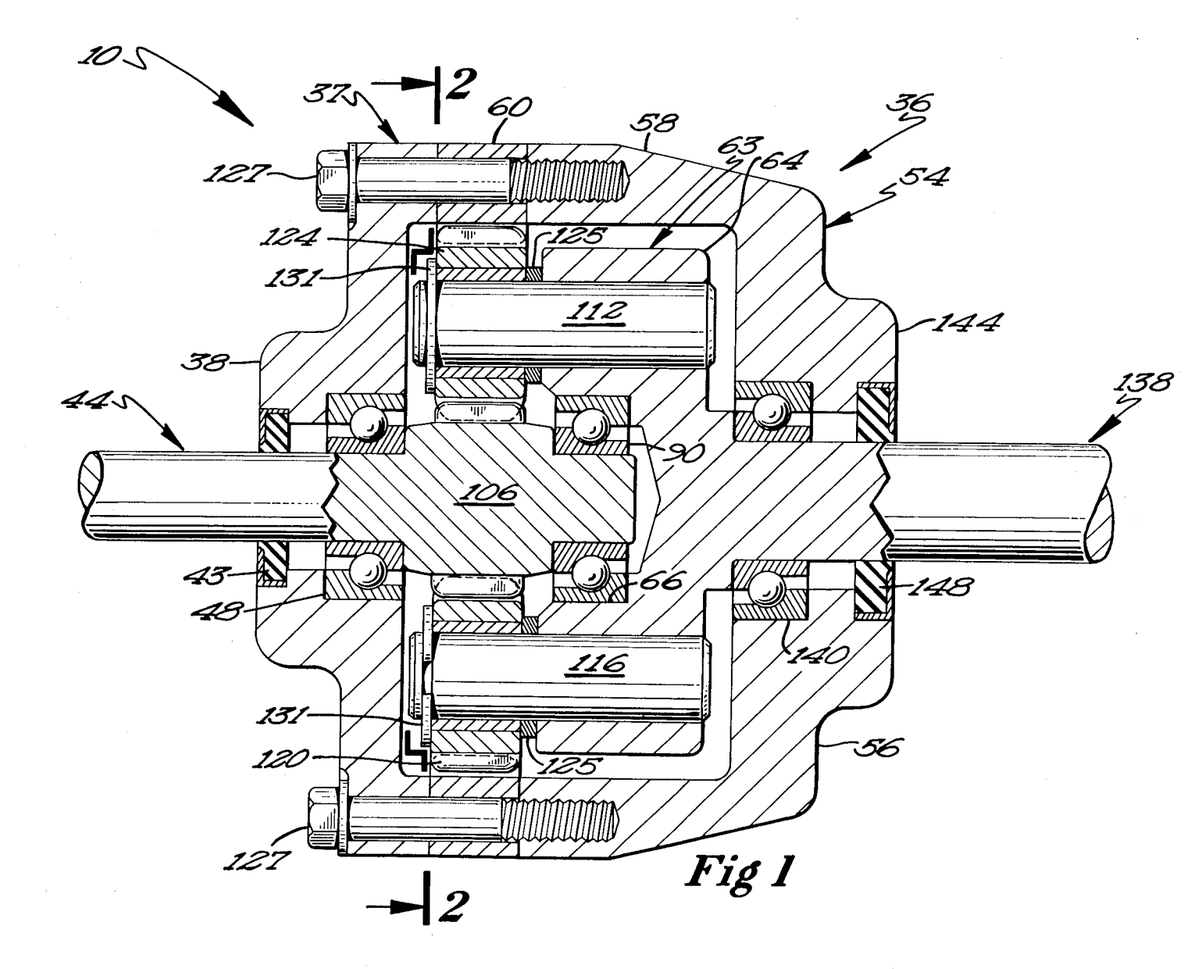
FIG. 1 shows a longitudinal sectional view through an infinitely variable transmission according to the teachings of the present invention.

An infinitely variable transmission according to the teachings of the present invention is shown in the drawings and generally designated 10. Infinitely variable transmission 10 includes a circular front power housing portion 37 having the hub portion 38. An input shaft 44 extends through hub portion 38 of the front power housing portion 37 and is mounted at one point in the bearing 48 mounted on shaft 44 and in hub 38 of the front input housing portion 37. Bearing 48 is in abutment with sun gear 106 fit on shaft 44. A sealing ring 43 is mounted in hub 38 and in sealing engagement with shaft 44.

The numeral 54 designates the rear power housing portion having the circular base portion 56 which terminates at its outer periphery in the annular wall portion 58. Interposed between the outer periphery of the housing portion 37 and the outer free end of the annular wall portion 58 of the rear output housing portion 54 is the internal ring gear 60. The front output housing portion 37 is connected to the ring gear 60 and the rear output housing portion 54 by means of a series of spaced bolts 127. The power housing 36 includes the front output portion 37, the annular wall portion 58, the ring gear 60, and the base portion 56. Due to the circular shape of portion 36 and base portion 56 and the cylindrical shape of portion 58 and gear 60, power housing 36 is dynamically balanced about the axis of input shaft 44, output shaft 138, and transmission 10.

Further provided is the planetary cage 63 mounted in the interior of power housing 36 and which includes the circular body portion 64 which has formed therein the axial bore 66. The front planetary cage 63 is rotatably mounted on the shaft 44 by means of bearing 90 fit in axial bore 66 formed in the body portion 64 of cage 63 and fit on shaft 44 in abutment with sun gear 106 fit on shaft 44. Thus, gear 106 is held longitudinally stationary in transmission 10 by bearings 48 and 90 which abut with gear 106.

Figure 2:
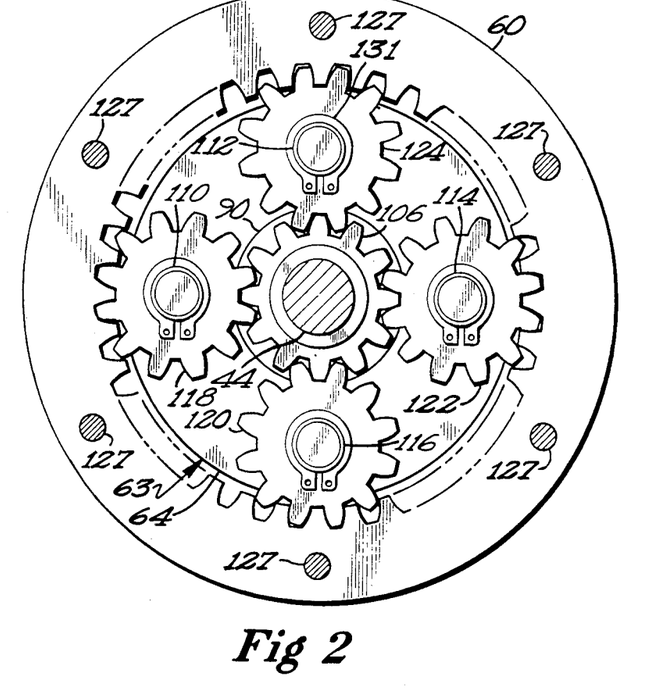
FIG. 2 shows a cross sectional view of the transmission of FIG. 1 according to section line 2—2 of FIG. 1.

Additionally provided are the series of four spaced pins 110, 112, 114, and 116 secured, such as by press fitting, in the body portion 64 of cage 63, each of which is radially outward of the axis of the circular base portion 56 and equidistant from the axis thereof. Mounted on the pins 110–116 are the planetary gears 118, 120, 122, and 124, respectively. All of the planetary gears 118–124 mesh with the sun gear 106 and the ring gear 60 of power housing portion 36. Further provided are shims 125 located on pins 110–116 in rotational abutment between circular body portion 64 of cage 63 and gears 118–124. C-clips 131 are further provided on pins 110–116 for retaining gears 118–124 thereon. Therefore, gears 118–124 are held longitudinally stationary in transmission 10 by shims 125 and C-clips 131 on pins 110–116 which abut therewith, and thus prevent end thrust on gears 118–124. It should then be noted that cage 63, pins 110–116, gears 118–124, and other related structure are dynamically balanced about the axis of input shaft 44, output shaft 138, and transmission 10.

The circular base portion 56 has formed therein the hub portion 144 through which extends the output shaft 138 formed integrally with and as part of the planetary cage 63. The shaft 138 is rotatably mounted in the bearing 140 mounted in the hub portion 144 of the circular base portion 56 and on the shaft 138. The sealing ring 148 is mounted in hub portion 144 of circular base portion 56 in sealing contact with the shaft 138. Bearings 90 and 140 rotationally abut on opposite sides of cage 63 and thus hold cage 63 longitudinally stationary in transmission 10. Thus, since cage 63 and gear 106 are both held longitudinally stationary in transmission 10, both input shaft 44 and output shaft 138 are likewise held longitudinally stationary in housing 36 and transmission 10.

In its most preferred form, gears 106 and 118–124 each have 16 gear teeth and ring gear 60 has 48 gear teeth. Thus, when power housing 36 is rotationally stationary, the stationary power housing gear ratio between input shaft 44 and output shaft 138 is 4:1. It can then be appreciated that if power housing 36 were not allowed to rotate but was held stationary, transmission 10 would act as a gear reduction unit or speed reduction unit.

The output shaft 138 may be connected to a unit to be powered, for example, the differential of an automobile, and the input shaft 144 rotates by being connected to a source of power, for example, an automotive engine. The sealed power housing 36 is filled with lubricant. It can be appreciated that the lubrication will tend to spread evenly around the outer periphery of the interior of power housing 36 when power housing 36 is rotated by centrifugal force.

Now that the structure of the present invention has been set forth, the operation of transmission 10 and the subtle features thereof can be explained and appreciated. For the sake of example, it will be assumed that the output load is stationary and sufficient to cause transmission 10 to use its torque converter effect, which will be explained further hereinafter, so in the initial acceleration of the output load some of the rotational effort will be lost due to slippage. As power is applied to input shaft 44 and it rotates, sun gear 106 is rotated as well. Gear 106 in turn rotates planetary gears 118–124 which in turn rotate cage 63 and output shaft 138 in the same direction as the input rotation. Due to inertia, initially the load is greatest on the output shaft 138 and slippage occurs when planetary gears 118–124 also rotate internal ring gear 60 in a direction opposite to the input rotation. Since ring gear 60 is part of the outer housing 36, outer housing 36 then rotates opposite to the input rotation. Thus, whenever the rotation of the power housing opposes the rotation of the input shaft 44, slippage or loss of rotational effort is occurring.

As output load is accelerated and input R.P.M. increases to a more constant level, overcoming initial load, then output load will decrease proportionately. The opposing rotation of power housing 36 will then begin to decelerate in a manner inversely synchronous with the continued acceleration of output shaft 138 and the output load. When the output load decreases to the point where there is less resistance to further accelerate the load than internal resistance in transmission 10, the power housing 36 will stop rotating and become stationary. At this point, unlike a torque converter, slippage has ceased to occur. Thus, input rotational effort is not lost and the transmission has reached its greatest amount of gear or speed reduction, without slippage, in the preferred embodiment a ratio of 4:1. It should then be appreciated that power is still of course lost due to drag and friction in transmission 10.

As output shaft 138 is further accelerated, power housing 36 begins to rotate in the same direction as input shaft 44 and output shaft 138 and also accelerates as does the output shaft 138. It should then be noted that the reversal of rotation from a direction opposite to input and output shafts 44 and 138, to a stationary position, and to a rotational direction the same as rotational shafts 44 and 138 is instantaneous, with output shaft 138 continuing to accelerate without hesitation.

It should then be appreciated that as power housing 36 accelerates in the same direction as output shaft 138, the gear reduction continues from the gear reduction when the output housing was stationary, in the preferred embodiment a ratio of 4:1, infinitely until the output load is rotating nearly at the same speed as the input load of the power source, or in other words, when the ratio of 1:1 is reached or in direct drive. A 1:1 ratio could only be achieved with a load of zero and could be reached only at a point of perfect balance between load and reversal of load. In direct drive, transmission 10 would rotate as a single unit around the transmission axis and act as a "fly wheel" with no internal resistance, thus achieving high efficiency. It should be noted that this "fly wheel" effect with reduced internal resistance and greater efficiency is also achieved even though a 1:1 ratio is not reached.

Assuming output shaft 138 has been accelerated and is rotating at a constant speed, if a greater load is placed on output shaft 138, further power would be necessary to drive the output shaft 138. As greater load is placed on output shaft 138, power housing 36 decelerates and thus the gear ratio begins dropping. If the gear ratio drops past the stationary power housing gear ratio, in the preferred embodiment of the present invention, past the 4:1 ratio, the outer housing would be stationary for an instant and then begin rotating in a direction opposite of the input and output rotations. It should then be appreciated that slippage then begins when the outer housing rotates in a direction opposite of the input and output shafts 44 and 138. In fact, if the load is sufficient, the ratio may drop to 1:0; hence, the output rotation has ceased and total slippage results, thus providing the torque converter effect. If the load is now decreased, or if the input rotation is increased sufficiently, the output load would then begin rotating and accelerating as described hereinbefore.

It can then be appreciated that the load of the output shaft 138 may be sufficient such that the input rotational power of shaft 44 can only accelerate shaft 138 to a ratio less than direct drive, such as a ratio of 2:1. It can then be further appreciated that with no fluctuations in input power or speed, output load, or the internal or external resistance on transmission 10, the gear ratio between input shaft 44 and output shaft 138 will remain at the 2:1 ratio. However, if any of these factors fluctuate, the gear ratio will vary a corresponding amount.

Assuming no external controls are provided for transmission 10, output shaft 138 may overrun input shaft 44. Overrun can occur in several occasions, such as in the event of reversal of the load force, if the input shaft 44 is stationary but the load on output shaft 138 is rotated, and the like. In the case of overrun, output shaft 138 will carry power housing 36 with it as a function of gears 60 and 118–124 at a rate dependent on the particular gear ratios of transmission 10. For example, in the preferred embodiment of the present invention, power housing 36 will rotate $1\frac{1}{3}$ revolutions for every revolution output shaft 138 overruns input shaft 44.

It should be noted that whether the input can drive the output without slippage of power housing 36 occurring, i.e., rotation in a direction opposite the rotation direction of the input and output, and the rate of acceleration depend on the internal resistance of transmission 10, input rotational speed, and amount of output load. Since internal resistance is a working part of transmission 10, it will need adjustment. For example, the number, size, width, and type of gears, tolerances, and lubricant amount and viscosity, and various other factors all will vary resistance and can be used to match the application. Furthermore, the internal resistance of transmission 10 varies with the operation of transmission 10. For example, the internal resistance in transmission 10 is directly related to the difference in rotational speed between the input shaft 44 and output shaft 138 due to gear drag and friction.

It can then be appreciated that transmission 10 has several advantages over conventional transmissions. First, transmission 10 is of a very simple design requiring fewer parts, of a smaller size, and easier to manufacture. Furthermore, transmission 10 is able to run at the correct or near correct ratio of input and output as a function of the input R.P.M. and torque, output load, the internal resistance of transmission 10, and the inertial forces of the drive train and load. Thus, the infinitely variable transmission 10 of the present invention allows the automatic selection of the gear ratio. Therefore, greater efficiency results because the source of power is able to operate at its most efficient speed under normal conditions. Furthermore, due to the infinite ratios available, transmission 10 is better able to keep the engine in a more efficient torque and R.P.M. range under normal conditions. Further, transmission 10 does not require any external controls to influence the gear ratio such that gear linkages and the like are not in any way required.

Furthermore, although transmission 10 has the ability to operate without any external controls for influencing the input/output rotational ratio, it may be desirable to provide external influence such as if the internal resistance is insufficient to initially rotate the output load to the stationary power housing ratio, to prevent the output from overriding the input, or to brake the output load to the stationary power housing ratio. One method of external influence is to control the rotation of power housing 36. For example, suitable braking apparatuses can be provided to selectively reduce the rate of rotation and/or to selectively prevent the rotation of power housing 36 in a direction opposite to the rotation direction of the input or output.

Figure 3:
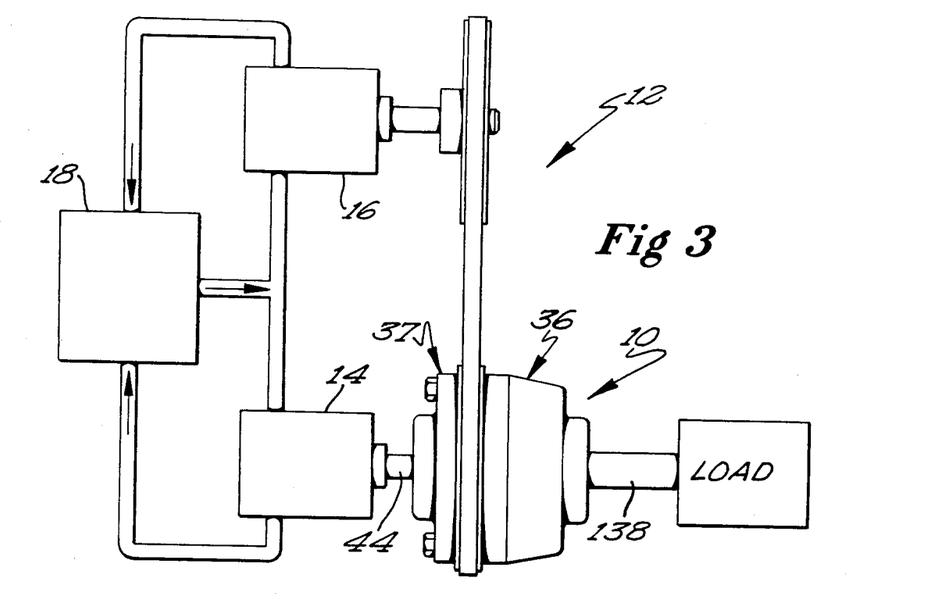
FIG. 3 shows a diagrammatic view of a power system utilizing the transmission of FIG. 1 according to the teachings of the present invention.
Figure 7:
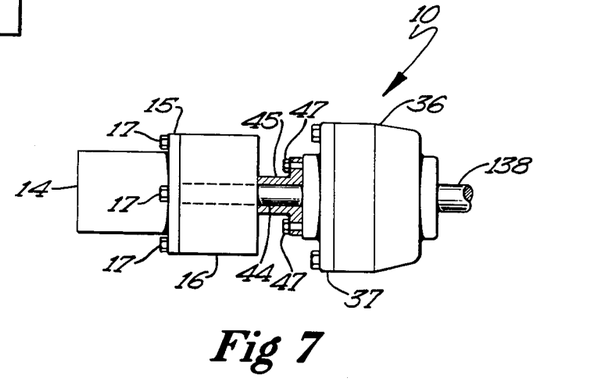
FIG. 7 shows a side, diagrammatic view of an alternate manner for driving the power housing of the transmission of FIG. 1 according to the teachings of the present invention.

Another method of influencing the resistance of transmission 10 according to the teachings of the present invention is diagrammatically shown in FIG. 3 and designated 12. System or power train 12 includes device 10 according to the teachings of the present invention, a first motor 14 for driving input shaft 44, and a second motor 16 for driving power housing 36 of the device 10 in the same rotational direction as shaft 44 is driven. Various methods can be provided for allowing motor 16 to drive power housing 36. For example, a belt and pulley device as shown in FIG. 3 may be provided, with the output of motor 16 including a pulley and ring gear 60 of power housing 36 including an integral pulley, with a drive belt rotatably relating the pulleys of motor 16 and power housing 36. Likewise, a concentric drive arrangement where the motor outputs would be of a common axis as shown in FIG. 7 may be provided where motors 14 and 16 are held in a non-rotatable relation such as by a series of spaed bolts 17 extending through flanged portion 15 of motor 14 and threadably secured to a motor 16 and with the output of motor 16 being in the form of a hub 45 having a flange at its free end connected to power housing 36 by bolts 47 and with the output of motor 14 extending through the center bore of hub 14 and rotatable within hub 45 of motor 16. A source of power 18 such as hydraulic, steam, or the like is further provided. In the preferred form, power source 18 and the first and second motors 14 and 16 are in a parallel relation to each other. In the preferred embodiment and as described hereinafter, the power source 18 is a hydraulic pump and the first and second motors 14 and 16 are hydraulic motors.

In the basic operation of power train 12, if the output load is great enough to cause slippage or loss of rotational effort in transmission 10, i.e., rotation of power housing 36 in a direction opposite to the input rotation, to cause motor 16 to rotate in reverse of power source 18, as motor 14 rotates the input shaft 44 of transmission 10, motor 16 will act as a pump or compressor which continues to compress or increase the power source 18 delivered to motor 14. Thus, motor 16 operates as a brake in preventing reverse rotation of power housing 36 of transmission 10 and also operates as an additional power source for motor 14 to place further torque on output shaft 138 for causing rotation thereof. It can then be appreciated that as the shaft 138 begins to rotate, the internal resistance of transmission 10 reduces and the torque of the reverse rotation of power housing 36 decreases to a point where it cannot overcome the power of motor 16. At that time, motor 16 stops power housing 36 from its reverse rotation and will begin to rotate power housing 36 in the same rotational direction as input shaft 44 and output shaft 138.

At the point when power housing 36 of transmission 10 ceases its reverse rotation and begins rotating in the direction of input shaft 44 and output shaft 138, motor 16 again operates as a motor instead of a pump, powered by the power source 18, and slippage of power housing 36 of transmission 10 ceases. It should then be appreciated that since power housing 36 is being rotated in the same direction as input shaft 44 and output shaft 138, faster acceleration of the gear ratios is obtained. Transmission 10 can then accelerate the gear ratio to approximately 1:1 even at loads greater than zero in a manner as described hereinbefore at which point both motors 14 and 16 would be rotating at the same speed.

Thus, motor 16 acts as an influencer to aid in increasing the rate of acceleration of the load, and requires less internal resistance in transmission 10 to effect the gear ratio, and in some applications would be more efficient.

Figure 4:
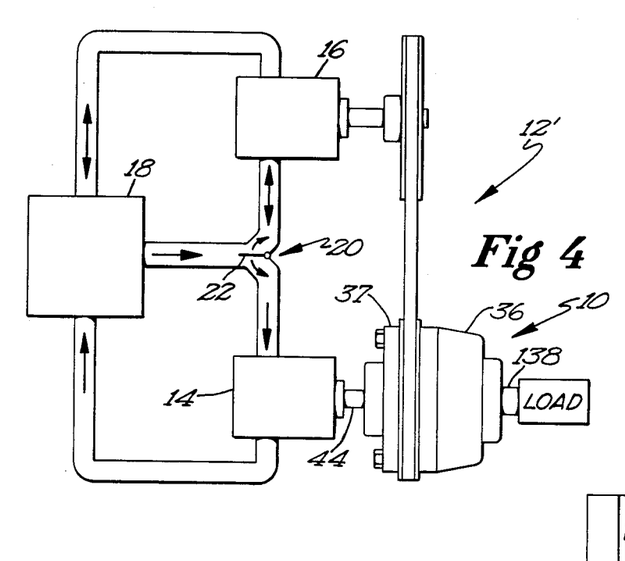
FIG. 4 shows a diagrammatic view of a power system utilizing the transmission of FIG. 1 according to the teachings of the present invention.

Another method of influencing the resistance of transmission 10 according to the teachings of the present invention is diagramatically shown in FIG. 4 and designated 12'. Generally, system or power train 12' is described as being of similar construction as power train 12 and further includes a differentiating valve assembly 20. Valve assembly 20 is interposed in the fluid circuit between power source 18 and drive motors 14 and 16. For purposes of ease of description, valve assembly 20 is shown as pivoting valve gate 22 located in the fluid circuitry movable between a first position for closing the fluid circuitry to motor 14 such that fluid flow from power source 18 is directed solely to motor 16 and a second position for closing the fluid circuitry to motor 16 such that fluid flow from power source 18 is directed solely to motor 14. Thus, it can be appreciated that as flow from power source 18 is reduced by valve assembly 20 to one of the motors 14 and 16 flow is proportionally increased to the other of the motors 14 and 16.

It should be appreciated that valve assembly 20 can be of different valve types and configurations than a valve gate type construction as utilized for ease of illustration and description of the teachings of the present invention, with different valve types and configurations possibly producing varied results. Additionally, valve assembly 20 can be formed of a combination of valves rather than a single valve as shown, to achieve the same results. Furthermore, valve assembly 20 could be controlled manually or automatically by various methods, which are within the skill of the art after the teachings of the present invention are known and understood.

It should be appreciated that valve assembly 20 does not totally control the flow rates to motors 16 and 18 and the speed range of power train 12', but rather synergistically cooperates and relates with the load compensating characteristics of transmission 10, aside from when valve assembly 20 is in either its first and second positions and when the load on output shaft 138 is zero. However, valve assembly 20 does affect the amount and rate of speed reduction obtained by load compensation in all positions between its first and second positions since valve 20 varies the amount of fluid resistance or restriction in the power flow from power source 18 to the motors 14 and 16. Valve assembly 20 greatly improves and enhances the performance of power train 12' by increasing the powered speed range of transmission 10 by enabling the power flow to be restricted to primary motor 14, as the flow and speed of motor 16 is increased, thereby decelerating input shaft 44 and accelerating the input outer housing 36 in a smooth and stepless manner. This acceleration of outer housing 36 can continue, overrunning input shaft 44, until the inlet port to motor 14 is sealed and motor 16 is receiving a maximum power flow as motor 14 now ceases in rotation. As stated hereinbefore, when outer housing 36 is driven and is overrunning input shaft 44 of transmission 10, a $1\frac{1}{3}:1$ speed reduction is obtained at output shaft 138 in the same rotational direction as outer housing 36. In particular and as an example of the use of power train 12' and assuming a constant volume pressurized power fluid flow from power source 18, a certain rotational load is applied to output shaft 138, and valve assembly 20 is in its second position closing the fluid circuitry to secondary drive motor 16 preventing the reversal of motor 16 to its compressor mode, motor 14 is rotated by a full power flow from power source 18 powering input shaft 44 of device 10 which is in its lowest mode of gear reduction, 4:1, without slippage present, and output shaft 138 powering the rotational load, as per the teachings set forth hereinbefore. As the load is initially rotated and acceleration thereof begins and continues, valve assembly 20 is gradually moved toward its first position diverting some of the power flow of power source 18 to secondary motor 16 as the power flow of power source 18 to primary motor 14 is gradually reduced. This action, begins the rotation and acceleration of the input outer housing 36 as input shaft 44 begins decelerating, causing a gradual increase in gear ratio in device 10. Continued output load acceleration and increasing gear ratio of device 10 continue as well, according to the teachings set forth hereinbefore. The rate of this acceleration can be controlled by controlling the rate or speed that valve assembly 20 is moved from its second position. Assuming that device 10 has reached a 1:1 gear ratio (direct drive mode), as per the teachings set forth hereinbefore, the power fluid flow from power source 18 is now split between both motors 14 and 16 and the speed of motor 14 has dropped by half. Since power source 18 is producing a constant volume power flow, we actually have a 2:1 speed reduction (by displacement) from power source 18 to motors 14 and 16, compared to the 1:1 ratio when only motor 14 is being powered, so while device 10 has increased in gear ratio fourfold, the power unit comprised of power source 18, valve assembly 20, motors 14 and 16, and the connecting power circuitry, has decreased in overall speed ratio twofold (considering only the fastest individual motor speed), which figures out to a total overall power train speed ratio of 2:1 reduction in this mode, with device 10 in the direct drive mode. So the total range of speed reduction of power train 12' to this mode would be from a 4:1 reduction to a 2:1 reduction. If valve assembly 20 is then moved towards its first position, more power flow of power source 18 is diverted to motor 16 and increasing the resistance of the flow to motor 14, thereby causing the deceleration of motor 14 and the acceleration of motor 16. This will cause the outer housing 36 of device 10 to begin overrunning input shaft 44, under power, in the same direction, which in turn would continue to accelerate the output shaft 138 and attached load, at a speed slightly slower than outer housing 36. This acceleration will continue until assembly 20 is in first position ceasing the rotation of motor 14 and causing the full power flow of power source 18 to be diverted to motor 16, which is now at full speed relative to the power input from power source 18. So the overall speed of the power unit comprised of power source 18, valve assembly 20, motors 14 and 16, and the connecting power circuitry, would increase back to 1:1, with only motor 16 doing the driving, powering device 10 at a $1\frac{1}{3}:1$ reduction, with an overall power train speed reduction of $1\frac{1}{3}:1$. This increases the speed range of power train 12', providing a 4:1 to $1\frac{1}{3}:1$ range of infinite, stepless overall speed reduction, with instant response to load change or valve positioning. It should be appreciated, however, that power train 12' would also be able to provide for slippage due to excessive output loading, according to the teachings set forth hereinbefore, but in power train 12', valve assembly 20 must be in a more central position, allowing a reverse power flow through motor 16 which is in the compressor mode when a loss of rotational effort or slippage occurs. Valve assembly 20 also greatly enhances the dynamic braking ability of power train 12' by sealing fluid flow to motor 16, forcing the gear ratio down to 4:1, causing the output load to decelerate. This is accomplished by the increase and overspeed of motor 14, causing the return flow to power source 18 to become pressurized, creating a compressive resistance facilitating the deceleration of the output shaft 138 and its attached load.

Thus, it can be appreciated that although a 1:1 ratio may be achieved by transmission 10 according to the teachings of the present invention, it is believed that power train 12' including transmission 10 according to the teachings of the present invention is further advantageous. Specifically, even through a lesser $1\frac{1}{3}:1$ speed reduction ratio is obtained by power train 12', a greater speed, range is obtained with transmission 10 utilized in power train 12' as set forth hereinbefore.

It should be appreciated that the power trains and their gear ratios have been described based upon 100% efficiencies. The actual values of the power train will then depend upon the efficiencies actually obtained according to the particular design utilized according to the teachings of the present invention.

It should be appreciated that an infinite speed range from a 1:0 ratio to a 1:1 ratio and overdrive, forward and reverse, could be obtained from system 12' of FIG. 4 according to the teachings of the present invention. This would involve utilizing various types and displacements of power sources 18 and motors 14 and 16, various types, configurations, and combinations of valve assemblies 20, various gear tooth ratios of transmission 10, and similar variations.

For example, a variable displacement pump could be utilized in the power trains according to the teachings of the present invention to enhance the torque output and speed range over conventional hydrostatic systems for a given displacment. Specifically, if a variable volume pump providing 0-1 cubic inch per revolution (c.i./rev.) and fixed displacement motors each having 1 c.i./rev., coupled with a transmission 10 with a 10:1 ratio (initial mode, fixed ring gear) were employed, the power train would have a 1:0 to 1.1:1 speed range at a certain torque output, depending on system pressure. To accomplish this same speed range with approximately equivalent torque capacity in a conventional hydrostatic system would require a variable volume pump with a 0-10 c.i./rev. or a tenfold increase in pump displacement and a corresponding motor displacement. Thus, power train 12' would be clearly economically competitive with conventional systems. However, system 12 is clearly advantageous over conventions systems since with the simple addition of some valves, a high and low range of drive, or two speed drive, could also be obtained, with motor 14 providing the variable low speed range and motor 16 providing the variable high speed range. This could all be done smoothly and steplessly without gear engagement/disengagements.

Likewise, with a fixed displacement pump and a control valve regulating the power flow to both motors, this same speed range of 1:0 to 1.1:1 could easily be obtained, with similar torque characteristics, assuming the same pressures are used as in the previously mentioned variations. Obviously some efficiency would be lost due to initial pump flow being diverted to the reservoir for speed control from 1:0 to a 10:1 reduction (depending on the ratios of device 10) but for many applications, this loss would prove to be miniscule opposed to the savings in using less expensive fixed displacement pumps, and in the range from 10:1-1.1:1 reduction, the operation would be the same as with a variable displacement pump. A two speed range could also be provided for as with the variable volume pump system, although these high and low ranges would be at a constant speed with the fixed displacement motors. For some uses, a fixed speed is desirable, especially if it can be selected quickly and smoothly.

Now that power trains 12 and 12' according to the teachings of the present invention have been set forth, additional examples of possible power sources 18 can be set forth and appreciated. Specifically, a further example of power source 18 which may be utilized is set forth in FIG. 5. Specifically in FIG. 5, an air inlet 122 provides fresh air intake to rotary compressor 124, which forces compressed air through the air inlet port 125 of combustor 132. The compressed air flows into the combustor 132 and into combustion chamber 130 through perforations or serrations in combustion chamber 130. Fuel is injected at the closed end of the combustion chamber 130 by fuel injection device 128, making a combustable air-fuel mixture which is then ignited by ignition device 126, in combustion chamber 130. As the combustion process is completed, the hot pressurized gases exit out combustion outlet 134 of the power circuitry. These pressurized gases, hereinafter referred to as the power fluid, enter rotary compressor driver motor 136, providing the power for motor 136 to drive rotary compressor 124 via drive shaft 139. The power fluid then flows through power circuit portion 140 for distribution to rotary output motors 14 and 16 according to the teachings of the power trains 12 and 12' of FIGS. 3 and 4. The spent power fluid gases exit motors 14 and 16 via exhaust portion 148 of the power circuitry.

Figure 5:
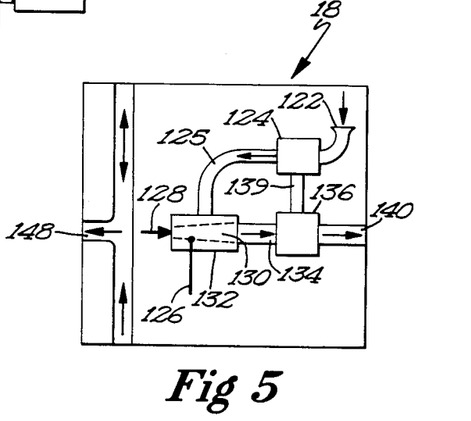
FIG. 5 shows a diagrammatic view of a power source which may be utilized in the power systems of FIGS. 3 and 4 according to the teachings of the present invention.

An electric starter or other rotational power source begins rotating and accelerating the compressor 124 and compressor driver motor 136, which are connected by drive shaft 139. This starting device is needed only to provide the initial rotation, until the ignition process stabilizes and the power source 18 or 18' can sustain its own rotational power due to the nature of its power source and inertial effects. The rotation of compressor 124 draws air into the compressor housing through air intake 122. This air is then forced by compressor 124 through inlet port 125 and into combustor 132, and then enters combustion chamber 130, where fuel is added by fuel injector 128, and the air-fuel mixture then flows past the ignition device 126 where it is ignited and begins burning and expanding into the combustion chamber 130, where the combustion process continues and the velocity of the combusted mixture accelerates as it flows into outlet port 134 and into the compressor driver motor 136. This hot pressurized combustion gas mixture provides driver motor 136 with the power needed to sustain the continued rotation of the compressor 124 via drive shaft 139. With only a small part of its power consumed, the combustion gases exit driver motor 136 via power circuit portion 140, and these gases are then distributed to output motors 14 and 16 as per the teachings of the present invention. These hot, pressurized gases then power either one or both motors 14 and 16, depending on the power train mode, and the spent gases then exit motors 14 and 16 via exhaust manifold portion 148 of the power circuitry. These still fairly hot and slightly pressurized exhaust gases could then either be released into the atmosphere or could be fed into heat exchangers, condensers or other types of regenerative devices in the interest of energy conservation to increase overall efficiency.

It should be understood that the combustion processes and power circuit flow are continuous in nature, once the original ignition occurs, the reaction is sustained by a constant supply of an air fuel mixture. The rate of combustion and power unit speed and power can be controlled by controlling the supply of fuel or throttling the air flow to the fuel mixture or a combination of both, either manually or automatically.

Figure 6:
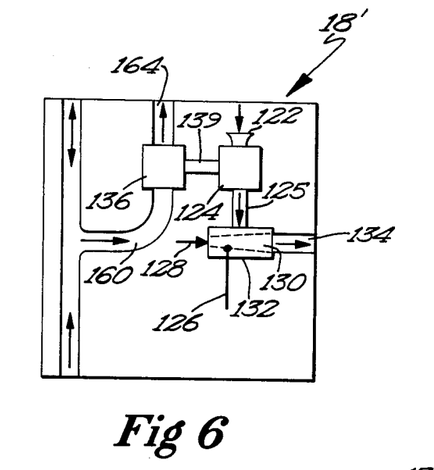
FIG. 6 shows a diagrammatic view of a power source which may be utilized in the power systems of FIGS. 3 and 4 according to the teachings of the present invention.

FIG. 6 depicts power source 18', a mechanical equivalent of power source 18 of FIG. 5, with an inverted power circuit design. In power source 18', the power fluid of combustion outlet 134 is distributed to motors 14 and 16 according to the teachings of the power trains 12 and 12' of FIGS. 3 and 4, bypassing the compressor driver motor 136, which is powered after motors 14 and 16 via power circuit manifold portion 160. In power source 18' of FIG. 6, as the hot, pressurized combustion gases exit via outlet port 134 of the combustor 132, instead of first entering the compressor driver motor 136, they are now first distributed to motors 14 and 16. As these mostly spent gases exit from motors 14 and 16, they enter primary exhaust manifold 160 of the power circuitry, and are then fed into the compressor driver motor 136. After powering compressor driver motor 136, the spent combustion gases are exhausted into exhaust, manifold portion 164 of the power circuitry, where they may, as in power source 18 of FIG. 5, be expelled into the atmosphere or enter heat exchangers, condensers or other regenerative devices.

It should be noted that output motor 16 could still act in the compressor mode if excessive output loads caused the reverse rotation of motor 16, in a smooth and stepless manner. This would be in the case of slippage induced into device 10 as per the teachings of the present invention according to the power train 12 of FIG. 3. Also, with a highly compressable power source medium, such as the aforementioned combustion gases, output shaft 138 could be stalled by an excessive load without stalling the power source of the present power train. The inlet to motor 14 would be further pressurized by motor 16 (acting in the compressor mode) and would produce a high torque output.

It should be appreciated that the compressor 122 and motors 14, 16, and 136 may be of many different types, positive and non-positive displacement in design such as: the "Roots" type configuration, the "vane" type configuration, "turbine" type configuration, as well as many others, based on the many types of rotary pumps, motors, compressors, etc. available in the art. The positive displacement type is believed to be the most advantageous and the description of the present invention was based on positive displacement components. It should also be noted that the combustable fuel could be injected or otherwise added to the intake air before entering the compressor, as well as the way described hereinbefore, i.e., after the compressor and in the combustor.

It can be appreciated that power trains 12 and 12' utilizing power sources 18 and 18' solve problems encountered with gas turbines, such as high speeds and non-positive displacement as well as excess air pumping. The present invention also allows the application of a highly efficient infinitely variable transmission with a continuous combustion prime mover instead of a less efficient intermittent combustion engine/stepped transmission power trains conventionally employed especially in vehicular applications.

It should be appreciated that power sources 18 and 18' according to the teachings of the present invention are extremely adaptable to regeneration devices and with proper design would need no external cooling. Further, due to the continuous combustion process, power sources 18 and 18' according to the teachings of the present invention meet current standards for harmful exhaust emissions without any additional appurtenances. Furthermore, power sources 18 and 18' according to the teachings of the present invention may be utilized with a wide variety of fuels and may also be adaptable for other types of chemical combustion/fusion processes other than with oxygen and conventional fuel.

It can then be appreciated that transmission 10, power trains 12 and 12', and power sources 18 and 18' each are of simple design, are economically advantageous, obtain greater efficiency, and are convenient to manufacture and service. Furthermore, they allow automatic control with no transmission control or other linkage mechanisms, and may eliminate the use of clutches, brakes, torque converters, and the like.

Now that the basic teachings of the present invention have been explained, many extensions and variations will be obvious to one having ordinary skill in the art. For example, gears 60, 106, and 118-124 can be designed to obtain other gear ratios than the gear ratios set forth for the preferred embodiment of the present invention.

Additionally, the internal configuration of transmission 10 may vary according to the teachings of the present invention from the construction shown in the preferred forms. For example, gears 60, 106, and 118-124 are shown in their preferred forms and are believed to be particularly advantageous; however, other gear forms can be utilized such as two-step planetary cluster gears in substitution for and/or in addition to gears 60, 106, and 118-124 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Infinitely variable transmission having no external controls comprising, in combination: a rotatable input; a rotatable output, with the input and output lying along and being dynamically balanced along a transmission axis; a power housing having an interior; means for rotatably mounting the power housing on the input about the transmission axis; means for rotatably mounting the power housing on the output about the transmission axis, with the power housing being dynamically balanced along the transmission axis; a drive gear located in the interior of the power housing and operatively attached to the input along the transmission axis; at least a first, planetary gear located in the interior of the power housing and operatively attached to the output along a planetary gear axis which is parallel to but spaced from the transmission axis, with the planetary gear being in gearing relation with the drive gear; a ring gear located in the interior of and operatively attached to the power housing along the transmission axis, with the ring gear being in gearing relation with the planetary gear; a lubricant having a viscosity located in the interior of the power housing, with the transmission having an internal resistance created by the drag and friction of the drive, planetary, and ring gears gearing together and the viscosity of the lubricant for influencing the rotation and acceleration of the output, wherein if the load is sufficient, the power housing will rotate in a direction opposite to the direction of the input and output when the output is initially accelerated and will cease rotation and begin rotating in the same direction as the direction of the input and output as the output is further accelerated; a first motor for driving the input in a rotation direction; a second motor; means for operatively attaching the second motor to the power housing for driving the power housing in the same rotation direction as the input shaft and adding to the internal resistance of the transmission for inhibiting the rotation of the power housing in a direction opposite to the direction of the input or output; a power source; means for transferring power between the first and second motors; means for transferring power from the power source to the motor power transferring means; and a differentiating valve assembly interposed between the power source and the first and second motors for adjustably varying the power flow from the power source between the first and second motors.

2. The device of claim 1 wherein the second motor operatively attaching means comprises, in combination: a drive belt operatively extending between pulley means located on the power housing and pulley means attached to the second motor.

3. The device of claim 1 wherein the first motor has an output for driving the input of the infinitely variable transmission, wherein the second motor has an output, with the second motor operatively attaching means comprising, in combination: a hub having a central bore, with the hub forming the output of the second motor, with the hub being secured to the power housing, and with the output of the first motor extending through and rotatably received within the central bore of the hub.

4. The device of claim 1 further comprising, in combination: a power source for providing power flow to the first and second motors; with the power source comprising, in combination: a combustion chamber; means for introducing fuel to the combustion chamber; and means for introducing air into the combustion for igniting the air and fuel mixture in the combustion chamber to produce a flow of pressurized gases, with the flow of pressurized gases being provided to the first and second motors.

5. The device of claim 4 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the compressor driving means and then to the first and second motors.

6. The device of claim 4 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the first and second motors and then to the compressor driving means.

7. Infinitely variable transmission having no external controls comprising, in combination: a rotatable input; a rotatable output, with the input and output lying along and being dynamically balanced along a transmission axis; a power housing having an interior; means for rotatably mounting the power housing on the input about the transmission axis; means for rotatably mounting the power housing on the output about the transmission axis, with the power housing being dynamically balanced along the transmission axis; a drive gear located in the interior of the power housing and operatively attached to the input along the transmission axis; at least a first, planetary gear located in the interior of the power housing and operatively attached to the output along a planetary gear axis which is parallel to but spaced from the transmission axis, with the planetary gear being in gearing relation with the drive gear; a ring gear located in the interior of and operatively attached to the power housing along the transmission axis, with the ring gear being in gearing relation with the planetary gear; a lubricant having a viscosity located in the interior of the power housing, with the transmission having an internal resistance created by the drag and friction of the drive, planetary, and ring gears gearing together and the viscosity of the lubricant for influencing the rotation and acceleration of the output, wherein if the load is sufficient, the power housing will rotate in a direction opposite to the direction of the input and output when the output is initially accelerated and will cease rotation and begin rotating in the same direction as the direction of the input and output as the output is further accelerated; a first motor for driving the input in a rotation direction; a second motor; means for operatively attaching the second motor to the power housing for driving the power housing in the same rotation direction as the input shaft and adding to the internal resistance of the transmission for inhibiting the rotation of the power housing in a direction opposite to the direction of the input or output; a power source for providing power flow to the first and second motors; with the power cource comprising, in combination: a combustion chamber; means for introducing fuel to the combustion chamber, means for introducing air into the combustion chamber, and means for igniting the air and fuel mixture in the combustion chamber to produce a flow of pressurized gases, with the flow of pressurized gases being provided to the first and second motors.

8. The device of claim 7 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the compressor driving means and then to the first and second motors.

9. The device of claim 7 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the first and second motors and then to the compressor driving means.

10. The device of claim 7 further comprising, in combination: a differentiating valve assembly interposed between the power source and the first and second motors for adjustably varying the power flow from the power source between the first and second motors.

11. The device of claim 7 wherein the second motor operatively attaching means comprises, in combination: a drive belt operatively extending between pulley means located on the power housing and pulley means attached to the second motor.

12. The device of claim 7 wherein the first motor has an output for driving the input of the infinitely variable transmission, wherein the second motor has an output, with the second motor operatively attaching means comprising, in combination: a hub having a central bore, with the hub forming the output of the second motor, with the hub being secured to the power housing, and with the output of the first motor extending through and rotatably received within the central bore of the hub.

13. Infinitely variable transmission having no external controls comprising, in combination: a rotatable input; a rotatable output, with the input and output lying along and being dynamically balanced along a transmission axis; a power housing having an interior; means for rotatably mounting the power housing on the input about the transmission axis; means for rotatably mounting the power housing on the output about the transmission axis, with the power housing being dynamically balanced along the transmission axis; a drive gear located in the interior of the power housing and operatively attached to the input along the transmission axis; at least a first, planetary gear located in the interior of the power housing and operatively attached to the output along a planetary gear axis which is parallel to but spaced from the transmission axis, with the planetary gear being in gearing relation with the drive gear; a ring gear located in the interior of and operatively attached to the power housing along the transmission axis, with the ring gear being in gearing relation with the planetary gear; a lubricant having a viscosity located in the interior of the power housing, with the transmission having an internal resistance created by the drag and friction of the drive, planetary, and ring gears gearing together and the viscosity of the lubricant for influencing the rotation and acceleration of the output, wherein if the load is sufficient, the power housing will rotate in a direction opposite to the direction of the input and output when the output is initially accelerated and will cease rotation and begin rotating in the same direction as the direction of the input and output as the output is further accelerated; a first motor having an output for driving the input in a rotation direction; a second motor having an output; means for operatively attaching the output of the second motor to the power housing for driving the power housing in the same rotation direction as the input shaft and adding to the internal resistance of the transmission for inhibiting the rotation of the power housing in a direction opposite to the direction of the input or output; with the second motor operatively attaching means comprising, in combination: a hub having a central bore, with the hub forming the output of the second motor, with the hub being secured to the power housing, and with the output of the first motor extending through and rotatably received within the central bore of the hub.

14. The device of claim 13 further comprising, in combination: a power source; means for transferring power between the first and second motors; means for transferring power from the power source to the motor power transferring means, and wherein if the load of the output is greater than the internal resistance of the transmission necessary to prevent rotation of the power housing in a direction opposite to the direction of the input or output such that the power housing rotates in the opposite direction than the direction of the input or output that the second motor functions as a secondary power source to deliver increased power to the first motor.

15. The device of claim 13 further comprising, in combination: a power source for providing power flow to the first and second motors; and a differentiating valve assembly interposed between the power source and the first and second motors for adjustably varying the power flow from the power source between the first and second motors.

16. The device of claim 13 further comprising, in combination: a power source for providing power flow to the first and second motors; with the power source comprising, in combination: a combustion chamber; means for introducing fuel to the combustion chamber for introducing air into the combustion chamber for igniting the air and fuel mixture in the combustion chamber to produce a flow of pressurized gases, with the flow of pressurized gases being provided to the first and second motors.

17. The device of claim 16 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the compressor driving means and then to the first and second motors.

18. The device of claim 16 wherein the air introducing means comprises, in combination: a compressor having an air inlet for receiving air at a first pressure and having an air outlet in fluid communication with the combustion chamber for delivering air at an elevated pressure to the combustion chamber; and means for driving the compressor, and wherein the flow of the pressurized gases are provided to the first and second motors and then to the compressor driving means.

* * * * *

UNITED STATES PATENT OFFICE
CERTIFICATE OF CORRECTION

Patent No. 4,704,923  Dated November 10, 1987

Inventor(s) Paul R. Taylor

It is certified that error appears in the above-identified patent and that said Letters Patent are hereby corrected as shown below:

Column 1, line 30, after "Further" insert --,--.

Column 1, line 56, after "relation" insert --between--.

Column 2, line 4, cancel ",".

Column 3, line 7, a new paragraph should start with "These".

Column 3, line 14, cancel ".".

Column 5, line 67 and column 6, line 1 should be printed contiguously.

Column 7, line 56, after "provided" insert --,--.

Column 7, line 58, cancel "spaed" and substitute therefor --spaced--.

Column 8, line 59, after "16" insert --,--.

Column 10, line 54, cancel ",".

Column 15, line 20, cancel "and".

Column 15, line 21, after "combustion" insert --chamber; and means--.

Column 16, line 16, cancel "cource" and substitute therefor --source--.

UNITED STATES PATENT AND TRADEMARK OFFICE
CERTIFICATE OF CORRECTION

PATENT NO. : 4,704,923

DATED : November 10, 1987

INVENTOR(S) : Paul R. Taylor

It is certified that error appears in the above-identified patent and that said Letters Patent is hereby corrected as shown below:

Column 18, line 19, after "chamber" insert --; means --.

Colimn 18, line 20, after "chamber" insert --; and means --.

Signed and Sealed this

Third Day of May, 1988

Attest:

Attesting Officer

DONALD J. QUIGG

Commissioner of Patents and Trademarks